April 21, 1953  S. R. PRANCE  2,635,293
METHOD FOR CURING RUBBERLIKE MATERIALS
Filed Feb. 15, 1950
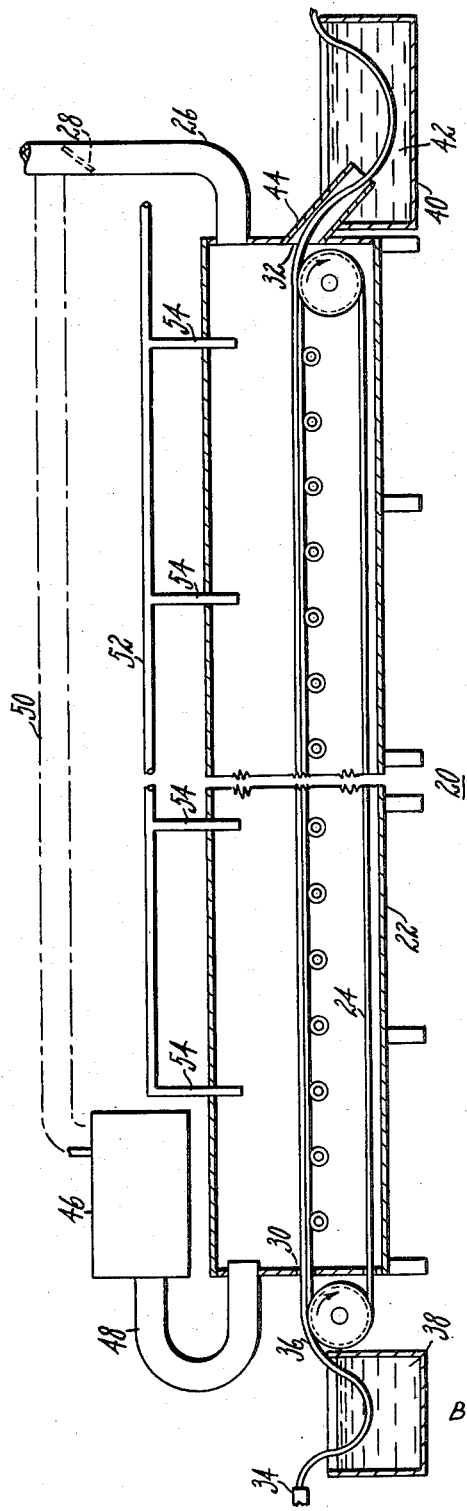
INVENTOR
STANLEY R. PRANCE
BY
HIS ATTORNEYS Patented Apr. 21, 1953

2,635,293

UNITED STATES PATENT OFFICE 2,635,293

METHOD FOR CURING RUBBERLIKE MATERIALS

Stanley R. Prance, Dayton, Ohio, assignor to General Motors Corporation, Detroit, Mich., a corporation of Delaware Application February 15, 1950, Serial No. 144,238

8 Claims. (Cl. 18—53)

This invention relates to a method for curing rubber and rubber-like materials and is particularly concerned with a method for curing such materials at high temperatures.

It is, therefore, an object of the invention to provide a method for curing rubber and rubber-like materials which are capable of vulcanization under accelerated conditions of time, through the use of high temperature curing procedures. In carrying out this object, it is a further object of the invention to cure the rubber-like materials at temperatures of from 500° F. to 900° F., whereby the cure is effected in a matter of from 1.25 to four or five minutes.

It is a further object of the invention to cure such materials in a controlled atmosphere whereby the rubber or rubber-like material is not charred or otherwise deleteriously effected by the elevated temperatures.

A still further object, in some cases, is to provide a method for curing rubber and rubber-like materials at elevated temperatures and, in short periods of time wherein steam is introduced into the curing chamber for providing an atmosphere substantially non-oxidizing to the surface of rubber or rubber-like materials.

A still further object of the invention is to provide a quench for the rubber-like material after curing whereby the cured material is reduced in temperature prior to exposure to the atmosphere for eliminating oxidation of the surface thereof.

A still further object, in some cases, is to provide a quench which conditions the material for providing desired surface characteristics, for example, glycerine and water quench.

Further objects and advantages of the present invention will be apparent from the following description, wherein the drawing shows diagrammatically a curing apparatus for extruded material.

Curing of rubber or rubber-like materials is a well known expedient in the art. Cures are usually carried out at temperatures in the order of 300° F. to 350° F. either in open steam or in closed molds wherein the cure requires from fifteen to thirty minutes for completion. The cure is effected through normal vulcanization of the product as is well known in the art wherein a vulcanizing agent such as sulphur with or without small additions of zinc oxide is added to the rubber or rubber-like compound.

In this connection, any compound capable of vulcanization may be cured in the process and apparatus to be explained in detail hereinafter. Specifically natural rubber, butadiene-styrene copolymers, butadiene-acrylonitrile copolymers, polychloroprene and compatible mixtures of any of the foregoing are illustrative of some of the many types of rubber and rubber-like materials which may be cured. It is to be understood that the particular compound forms no portion of this invention and that the only limitation in this respect is that the compound of the rubber or rubber-like material will be capable of vulcanization.

The method as disclosed herein is best adapted to continuous processing, such as, continuous curing of the product of a tuber or other type of machine, although it will be apparent that articles may be cured in the same manner in the same curing oven or retort.

One type of apparatus is shown diagrammatically at 20 and consists of an elongated tunnel-like oven 22 having an endless conveyor 24 passing therethrough. The oven 22 is preferably insulated, not shown, to conserve heat and is vented through a stack 26 which includes a draft control damper 28 therein. The oven or chamber 22 includes an inlet 30 and an outlet 32 adjacent opposite ends thereof and through which the rubber-like material may be passed. A tuber head shown at 34, produces a continuous formed length of uncured rubber-like material 36 which passes directly through a solution 38 of soap or other material to prevent subsequent sticking and then passes through the entrance 30 on the conveyor 24 into the oven 22. After passing the entire length of the oven 22, the rubber-like material passes through exit 32 into a tank 40 which includes a quenching liquid 42 therein. Preferably a tunnel-like baffle or tunnel 44 is provided to assure that the rubber-like material passes below the surface of the liquid 42 without exposure to the atmosphere.

In order to heat the oven 22, a gas fired unit 46 is provided which has an outlet 48 connecting to the chamber 22. The unit 46 burns gas and may be adjusted for incomplete combustion thereof whereby atmospheres may be produced having predetermined and desired quantities of carbon monoxide, carbon dioxide, oxygen, etc. Thus the unit 46 not only acts as a heater for the chamber 22 but also as a gas producer for supplying a desired and controlled atmosphere to the chamber 22. The unit 46 is preferably a forced draft device wherein a blower (not shown) produces a continuous flow of heated gas through the connection 48. In some cases, it may be desirable to use a regenerating process for the gas to conserve heat in which event a pipe 50, shown in dotted lines, may be used connecting the outlet 26 to the gas producing heater unit 46. Flow of exhaust gas through the pipe 50 may be controlled through the use of suitable dampers, not shown, to be used as a portion only of the incoming air supply for the heater and atmosphere unit 46. In other words, the exhaust gases coming through pipe 50 may be mixed in any desired quantities with atmospheric air for primary and secondary air for the unit 46.

A branch pipe 52 is also provided which has a plurality of lead-offs 54 preferably evenly spaced throughout the length of the chamber 22. Pipe 52 carries steam which is exhausted through the lead-offs 54 into the oven 22.

The heater unit 46, in some cases, may not have the capacity to bring the temperature of the oven to the desired point in which event electrical booster units, not shown, may be provided within the chamber 22. Similarly, if the unit 46 is used merely as a gas producing unit to supply controlled atmosphere only to the oven, it is possible to carry out the entire heating of the oven 22 through the use of electrical heaters or other suitable means. In other words, it is to be understood that the oven 22 may be heated in any desired manner and that the controlled atmosphere may be supplied thereto in any desired manner to accomplish the results to be stated hereinafter.

The basis for the present curing method resides in the high temperatures utilized during the cure. We have found that temperatures ranging from 500° F. to 900° F. form a suitable range in which rubber and rubber-like materials may be cured without deterioration thereof either by charring or other deleterious surface effects. This is accomplished through the use of a controlled atmosphere within the oven which may be supplied, as noted, by the unit 46 or may be supplied from tanked gases, etc. We have found that if the oxygen content within the oven is maintained within predetermined limits, that the atmosphere is substantially non-oxidizing in character to rubber-like material. When the atmosphere contains oxygen over 8%, there is a tendency, as the high end of the temperature range is approached, for the rubber to char and otherwise disintegrate. If the oxygen in the atmosphere is maintained at 8% or less, this tendency is substantially eliminated at the upper end of the temperature range. The oxygen content may be as high as 14% toward the lower end of the temperature range. Stated differently, for a temperature range of from 500° F. to 900° F. the oxygen content must vary inversely from 14% to 8%. In this connection, if only air is used as the oven atmosphere, the rubber-like material, being cured, will actually char and/or burn. In place of an atmosphere produced by a unit, such as unit 46, which atmosphere is essentially incompletely burned, natural gas, nitrogen, carbon dioxide, carbon monoxide, mixtures thereof together or with air, may all be used providing the oxygen content of the complete mixture is maintained within the range of 8% to 14% depending on the temperature. It is apparent that any of these gases may be used in pure form with equally good results although the expense is much greater.

We have further found that the introduction of steam has a beneficial effect on the cure and to this end we sometimes introduce steam into the oven. This introduction is not entirely necessary but it supplements the atmosphere with a non-oxidizing gas and thereby aids in cutting the cost of the operation.

In general, the cure requires about 4 minutes at a temperature of 500° F. about 2.5 minutes at a temperature of 600° F., about 1.5 minutes at a temperature of 800° F., about 1.25 minutes at the temperature of 900° F. with the 600° F. temperature being the preferred range.

In all cases, it is desirable to cool the cured rubber prior to exposure of atmospheric air and thus minimize surface oxidation. This is most easily accomplished by merely passing the rubber part directly from the oven into a quenching tank filled with water or other liquid to be discussed later. This quench cools the external surface of the vulcanized part rapidly thereby preventing surface oxidation but probably does not completely cool the internal portions of the part, whereby it may be possible that some further curing action takes place after the material comes from the quench. Instead of water, a glycerine mixture may be used in the quenching tank which produces desirable surface characteristics on the quenched part. Also other organic alcohols may be used for specific results. The apparatus, as diagrammatically shown herein, is synchronized with the tuber head so that no stretching of the tubed part occurs during the transfer thereof from tank 38 to conveyor 24, etc. Also, the catenary, noted in the quenching tank, should be controlled so that the part is sufficiently cooled to prevent any stretching. This sometimes requires the use of a longer tank than shown wherein the cooled material may be carried on rollers at the bottom of the tank.

The method shown herein is a tremendous improvement over conventional curing processes in that the time required for the cure is greatly reduced, thereby permitting considerably higher production to be run through a given oven. Actual tests, such as, resiliency, aging characteristics, and other physical properties, and the like of materials cured by the accelerated process described herein are equally as good as those of materials cured under standard curing conditions.

It is to be understood that any of the conventional rubber or rubber-like compounds, capable of vulcanization, can be used in this process. In this connection, however, an increase in the amount of accelerator used is desirable. In general, accelerator in quantities of from 2 to 6 times the normal quantities is recommended.

A specific example in the curing of a sealing strip wherein the strip has a maximum thickness cross section of approximately ¼ of an inch is as follows: The stock used had a formula of:

| | Per cent |
|---|---|
| Butadiene-styrene copolymer, 30.5% <br> Natural rubber, 9% | 39.5 |
| Zinc oxide | 2 |
| Carbon black | 42.2 |
| Anti-oxidant (Agerite White) | 0.2 |
| Wax (Micro-crystalline) | 3 |
| Plasticizer (mineral oil) | 7.5 |
| Cumar resin | 4.5 |
| Accelerator (zimate) | 1.1 |

This stock was properly prepared and then 99.1% of the stock had added thereto .9 of a percent of sulphur just prior to tubing.

The stock above noted was tubed into a strip which was carried through soap water into the oven at a rate of from 35 to 45 feet per minute. The oven is about 100 feet long and temperature therein was maintained at from 575° F. to 625° F. The atmosphere analysis during the cure was as follows:

| | Per cent |
|---|---|
| Oxygen | 5 to 8 |
| Carbon dioxide | 3 to 5 |
| Carbon monoxide traces to | 2 |
| Water vapor | 40 to 60 |

Nitrogen, the remainder.

The rubber strip, after curing, was carried directly into a tank of water 15 feet in length) maintained at a temperature from 55 to 75° F. Thus the time required for curing any given part of the tubed strip was in the order of from 2 to 3 minutes.

Similar satisfactory results have been obtained with a wide variety of cross sections of material. It is to be understood that the speed of travel must be correlated to compensate for the temperatures involved and maximum thickness of cross sections of material being cured in order to obtain satisfactory cures. Thus, it is advisable to make a test run on each new cross section of material in order to assure proper curing thereof. In all cases, however, when using the elevated temperatures under controlled atmospheric conditions, it is possible to effect the cure in a short period of time ranging from 1¼ to 4 or 5 minutes.

As previously mentioned any vulcanizable rubber-like compound can be cured in the manner proposed herein, that is, compounds embodying the usual rubber-like materials, vulcanizing agents, accelerators, and anti-oxidant, etc. Specifically, the following formula gives ranges which yield satisfactory results:

| | Parts |
|---|---|
| Rubber-like polymer or copolymer | 100 |
| Vulcanizing agent (sulphur, zinc oxide, fatty acid) | 1 to 10 |
| Pigment and/or filler | 0 to 150 |
| Anti-oxidant | 0.5 to 3 |
| Accelerator | 0.5 to 8 |

To this material may be added a plasticizer when necessary. This is particularly desirable when the material is to be tubed to soften the same and in the case of plasticizers, a range of from 0 to 50 parts may be used.

In the process disclosed, it will be noted that the cure takes place under pressures only slightly in excess of atmospheric pressure, that is to say, the pressure within the furnace is only sufficient to create the desired atmosphere. This differs from the usual curing process where steam is used under pressure, necessitating seals and the like on the apparatus.

While the embodiments of the present invention as herein disclosed, constitute preferred forms, it is to be understood that other forms might be adopted.

What is claimed is as follows:

1. In the method of curing compounded rubber-like materials including a vulcanizing agent, the steps comprising; shaping vulcanizable uncured rubber-like material, supplying said material to an oven, heating the material at a temperature of at least 500° F. and not more than 900° F. at a pressure slightly in excess of atmospheric pressure in an amosphere of incompletely burned natural gas containing from 14% to 8% oxygen varying inversely as the temperature and for a time ranging from about 4 minutes to 1.25 minutes, and then immediately cooling the vulcanized part under non-oxidizing conditions before exposure to the atmosphere.

2. In the method of curing compounded rubber-like materials including a vulcanizing agent, the steps comprising; shaping vulcanizable uncured rubber-like material, supplying said material to an oven, heating the material at a temperature in the neighborhood of 600° F., at a pressure slightly in excess of atmospheric pressure in an atmosphere which is non-oxidizing to the material and wherein the oxygen content is in order of and does not exceed 14%, for about 2.5 minutes, and then immediately cooling the vulcanized part under non-oxidizing conditions before exposure to the atmosphere.

3. In the method of curing compounded rubber-like materials including a vulcanizing agent, the steps comprising; shaping vulcanizable uncured rubber-like material, supplying said material to an oven, heating the material at a temperature of at least 500° F. and not in excess of 600° F. at a pressure slightly in excess of atmospheric pressure for a time ranging from 4 minutes to 2.5 minutes and in an atmosphere containing between 14% and 8% oxygen, and finally cooling the vulcanized part before exposure to the atmosphere.

4. In the method of curing compounded rubber-like materials including a vulcanizing agent, the steps comprising; shaping vulcanizable uncured rubber-like material, supplying said material to an oven, heating the material at a temperature of at least 500° F. and not more than 900° F. at a pressure slightly in excess of atmospheric pressure in an atmosphere containing oxygen within the range of 14% and varying inversely as the temperature and for a time ranging from about 4 minutes to 1.25 minutes, and then immediately quenching the vulcanized part in water.

5. In the method of curing compounded rubber-like materials including a vulcanizing agent, the steps comprising; shaping vulcanizable uncured rubber-like material, supplying said material to an oven, heating the material at a temperature of at least 500° F. and not more than 900° F. at a pressure slightly in excess of atmospheric pressure in an atmosphere of incompletely burned natural gas containing from 14% to 8% oxygen varying inversely as the temperature and for a time ranging from about 4 minutes to 1.25 minutes, and then immediately quenching in a continuous method for curing the rubber-like material.

6. In a method for continuously curing compounded vulcanizable rubber-like material including a vulcanizing agent, the steps comprising; continuously shaping said uncured vulcanizable material, supplying a continuous length of said material to an oven, moving the material through the oven at a substantially constant rate so that the material remains in the oven for from 1½ minutes to 4 minutes depending on the temperature, heating the material to a temperature ranging from 900° F. at a pressure slightly in excess of atmospheric pressure to 500° F. in an atmosphere which is non-oxidizing to the surface of the rubber-like material and which contains oxygen in quantities of not in excess of 8% to 14% depending on the temperature, and then continuously cooling the part after curing in a non-oxidizing medium.

7. In a method for continuously curing compounded vulcanizable rubber-like material including a vulcanizing agent, the steps comprising; continuously shaping vulcanizable material, supplying a continuous length of said material to an oven, moving the material through the oven at a substantially constant rate so that the material remains in the oven for from 1½ minutes to 4 minutes depending on the temperature, heating the material to a temperature ranging from 900° F. to 500° F. at a pressure slightly in excess of atmospheric pressure in an atmosphere which is non-oxidizing to the surface of the rubber-like material, and which contains oxygen in quantities of not in excess of 8% to 14% depending on the temperature, and then continuously quenching the part in water.

8. In the method of curing compounded rubber-like materials including a vulcanizing agent under accelerated conditions, the steps comprising; shaping vulcanizable uncured rubber-like material, supplying said uncured compound to an oven, supplying an atmosphere to said oven consisting of a non-oxidizing gas at pressures approximating but slightly greater than atmospheric pressure and wherein the oxygen content is in the range of from 14% to 8%, heating the rubber-like material while in said atmosphere to a temperature between 500° F. and 900° F. at a pressure slightly in excess of atmospheric pressure for a time sufficient to cure the material and then immediately cooling the vulcanized material under non-oxidizing conditions before exposure to the atmosphere.

STANLEY R. PRANCE.

References Cited in the file of this patent

UNITED STATES PATENTS

| Number | Name | Date |
|---|---|---|
| Re. 22,188 | Minor | Sept. 29, 1942 |
| 1,289,043 | Comstock | Dec. 24, 1918 |
| 1,963,943 | Gross | June 19, 1934 |
| 2,008,861 | Gray | July 23, 1935 |
| 2,290,550 | Gessler | July 21, 1942 |
| 2,549,396 | Somerville | Apr. 17, 1951 |

OTHER REFERENCES

Vanderbilt, Rubber Handbook, 1948, (230 Park Ave., New York City) pg. 209, 81.